United States Patent
Kaplan (10) Patent No.: US 12,332,357 B2
(45) Date of Patent: Jun. 17, 2025

(54) INTERFERENCE DETECTION IN A GNSS SIGNAL

(71) Applicant: Infinidome Ltd., Caesarea (IL)

(72) Inventor: Moshe Kaplan, Pardes Hana-Karkur (IL)

(73) Assignee: Infinidome Ltd., Caesarea (IL)

( * ) Notice: Subject to any disclaimer, the term of this patent is extended or adjusted under 35 U.S.C. 154(b) by 365 days.

(21) Appl. No.: 17/899,647

(22) Filed: Aug. 31, 2022

(65) Prior Publication Data

US 2023/0067684 A1 Mar. 2, 2023

Related U.S. Application Data

(60) Provisional application No. 63/239,973, filed on Sep. 2, 2021.

(51) Int. Cl.
   *G01S 19/21* (2010.01)

(52) U.S. Cl.
   CPC ..................... *G01S 19/21* (2013.01)

(58) Field of Classification Search
   CPC ....................................... G01S 19/21
   See application file for complete search history.

(56) References Cited

U.S. PATENT DOCUMENTS

| | | | |
|---|---|---|---|
| 6,639,541 B1 | 10/2003 | Quintana et al. | |
| 7,852,264 B2 | 12/2010 | Zaruba et al. | |
| 8,345,730 B2 | 1/2013 | Le Liboux et al. | |
| 8,958,511 B2 | 2/2015 | Joo et al. | |
| 9,581,700 B2 | 2/2017 | Hyun | |
| 9,958,549 B2 | 5/2018 | Psiaki et al. | |
| 10,091,754 B2 | 10/2018 | Miller | |
| 10,545,246 B1 | 1/2020 | Johnston et al. | |
| 10,690,779 B2 | 6/2020 | Raasakka et al. | |
| 2013/0063308 A1* | 3/2013 | Krasner | G01S 19/21 342/393 |
| 2014/0269850 A1* | 9/2014 | Abdelmonem | H04W 64/00 375/148 |
| 2016/0047915 A1* | 2/2016 | Raasakka | H04K 3/90 342/357.59 |
| 2020/0064490 A1 | 2/2020 | Lennen | |
| 2021/0127284 A1* | 4/2021 | Abdelmonem | H04W 24/08 |

\* cited by examiner

*Primary Examiner* — Peter M Bythrow
*Assistant Examiner* — Nazra Nur Waheed (57) ABSTRACT

An interference detector for detecting interference in Global Navigation Satellite System (GNSS) includes an RF splitter, multiple detectors and a comparator. RF splitter, splits a radio frequency (RF) input signal into multiple RF output signals which are provided to respective detectors. Each of the detectors includes a bandpass filter and a peak detector. The bandpass filter filters the RF output signal into a respective GNSS frequency band and the peak detector detects the peak level of the filtered RF signal. The comparator analyzes the peak detector outputs and identifies whether interference is present in the GNSS frequency bands by comparing the peak levels to respective thresholds. Based on this analysis, the comparator outputs a signal that indicates the presence and absence of identified interference in the GNSS frequency bands.

21 Claims, 6 Drawing Sheets

FIG. 6

INTERFERENCE DETECTION IN A GNSS SIGNAL

RELATED APPLICATION(S)

This application claims the benefit of priority under 35 USC § 119(e) of U.S. Provisional Patent Application No. 63/239,973 filed on Sep. 2, 2021, the contents of which are all incorporated by reference as if fully set forth herein in their entirety.

FIELD AND BACKGROUND OF THE INVENTION

The present invention, in some embodiments thereof, relates to detecting interference in a radio frequency (RF) signal and, more particularly, but not exclusively, to detecting interference in a Global Navigation Satellite System frequency band.

Wireless communication is an essential aspect of today's technological landscape. The integrity of the wireless communication must be maintained in order to ensure proper operation of wireless communication networks, such as mobile telephone networks, Global Navigation Satellite System (GNSS), Wi-Fi networks and many others.

Jamming is often employed to disrupt wireless communications between transmitters and receivers in wireless networks. The jammers transmit jamming signals which are intended to prevent establishing a communication link between legitimate network transmitters and receivers. Jamming is particularly effective when the signal strength of the jamming signal is significantly higher than that of a legitimate received radio frequency (RF) signal.

There are also non-malicious sources of interference which can reduce the performance of wireless communication or even prevent establishing a wireless communication link. Examples of non-malicious interference are nearby transmitters operating in the same or close frequency bands and electromagnetic interference. There are a number of known techniques for providing resilience towards network jamming and other types of interference. Some networks employ frequency hopping or other redundancy mechanisms to improve the success of communication. A problem with these mechanisms is that they negatively influence the efficiency of the system. Other diversity mechanisms (such as using more antennas and/or more robust coding) have similar negative impacts because the diversity mechanisms could be used instead to improve bit-rates or system capacity.

A solution is needed to detect interference on wireless communications and to mitigate the deleterious effects of such interference efficiently, without imposing a large burden on system resources.

SUMMARY OF THE INVENTION

It is an object of the present invention to provide an apparatus and method for detecting interference in received Global Navigation Satellite System (GNSS) signals.

Embodiments of the invention filter a received RF signal into one or more GNSS frequency bands. Peak detection is performed on the filtered RF signals. A signal peak that exceeds a respective threshold indicates that there is interference in the respective frequency band. The output is an indicator signal which carries information about which (if any) frequency band is experiencing interference. Actions may be taken to mitigate adverse effects when interference is detected.

A benefit of the interference detector, system and method described herein is that a significant amount of the processing is performed by analog processing. In some embodiments, the peak level is compared to the threshold by digital processing. However, this comparison is a simple operation which requires few processing resources compared to more extensive digital signal processing of the RF signal. An additional benefit is that the interference signal levels may be determined for each of the frequency bands in which interference is detected.

This approach is effective against jamming attacks and non-malicious interference from other sources in the selected GNSS (and/or satellite) frequency bands.

The foregoing and other objects are achieved by the features of the independent claims. Further implementation forms are apparent from the dependent claims, the description and the figures.

According to an aspect of some embodiments of the present invention there is provided an apparatus for detecting interference in Global Navigation Satellite System (GNSS) signals. The apparatus includes and RF splitter, detectors and a comparator. The RF splitter splits a radio frequency (RF) input signal into multiple RF output signals. The detectors each include a bandpass filter and a peak detector. The filters one of the RF output signals into a respective GNSS frequency band and the peak detector detects the peak level of the filtered RF signal. The comparator identifies whether interference is present or absent in the GNSS frequency bands based on a comparison of the peak levels to respective thresholds and outputs a signal indicative of the presence and absence of identified interference.

According to some embodiments of the invention, the comparator includes an analog to digital (A/D) converter. The A/D converter converts an output of at least one of the peak detectors into a digitized output signal and the comparison is performed on the digitized output signal.

According to some embodiments of the invention, the apparatus further includes an RF switch configured to switch an input of the RF splitter between a multiple antennas in accordance with a control signal.

According to some embodiments of the invention, the RF splitter includes:
an RF input configured for inputting the radio frequency signal;
a first internal splitter configured for splitting the input RF signal into a first RF signal and a second RF signal;
a second internal splitter configured for splitting the second RF signal into the RF output signals; and
an RF output configured for outputting the first RF signal.

According to some embodiments of the invention, the apparatus further includes a digital signal processor configured to process at least one of the filtered output signals.

According to an aspect of some embodiments of the present invention there is provided a method for detecting interference in Global Navigation Satellite System (GNSS) signals. The method includes:
splitting an RF input signal into multiple RF output signals;
filtering the RF output signals into respective GNSS frequency bands;
detecting respective peak levels of the filtered RF signals;

for each of the GNSS frequency bands, identifying interference when a peak level of the respective filtered RF signal exceeds a respective threshold; and outputting a signal indicative of a presence and absence of identified interference in at least one of the GNSS frequency bands.

According to some embodiments of the invention, the method further includes digitizing at least one of the peak levels, wherein the identifying is performed on the digitized peak levels.

According to some embodiments of the invention, for at least one of the frequency bands, the level is an amplitude level.

According to some embodiments of the invention, for at least one of the frequency bands, the level is a power level.

According to some embodiments of the invention, for at least one of the frequency bands, the respective threshold is the expected level of a satellite signal received in the frequency band plus a specified margin.

According to some embodiments of the invention, for at least one of the peak detectors, the peak level is the maximum level of the RF output signal detected in a single time interval.

According to some embodiments of the invention, for at least one of the peak detectors, the peak level is the average of respective maximum levels detected in multiple time intervals.

According to some embodiments of the invention, detecting a peak level includes detecting respective maximum levels in a plurality of time intervals and calculating the peak level from the maximum levels.

According to some embodiments of the invention, a spectral analysis of at least one of the filtered output signals is provided.

According to some embodiments of the invention, an alert is issued when the presence of interference is identified in at least one of the GNSS frequency bands.

According to some embodiments of the invention, a portion of the RF input signal is output to a GNSS receiver.

According to some embodiments of the invention, a spectrum view of at least one of the filtered RF signals is displayed.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to detecting interference in a radio frequency (RF) signal and, more particularly, but not exclusively, to detecting interference in a Global Navigation Satellite System frequency band.

Satellite signals are received at ground-based receivers at very low power levels, often beneath the noise floor. On the other hand, signals received from closer transmitters will typically be received at higher power levels. When a received signal has a high peak level this may indicate that the received signal was not transmitted from a satellite and may be interfering with a legitimate satellite signal.

GNSS systems operate in established frequency bands. Embodiments of the invention filter a received RF signal into one or more GNSS frequency bands. The frequency bands may be different frequency bands in the same GNSS system (e.g. GPS L1 and L2) and/or frequency bands of different types of GNSS systems (e.g. GPS and GLONASS).

Peak detection is performed on the filtered RF signals. A signal peak that exceeds a respective threshold indicates that there is interference in the respective frequency band. In embodiments of the system and method described herein, and indicator signal carrying information about which (if any) frequency band is experiencing interference is output.

Embodiments may be adapted to all GNSS constellations, including but not limited to:

1) GPS—L1 C/A, L1C, L2 C, L2 P and L5;
2) GLONASS—L1 C/A, L2 C, L2 P and L3 OC;
3) Galileo—E1, E5a, E5b, E5 AltBOC and E6;
4) BeiDou—B11, B21, B31, B1C, B2a and B2b;
5) NAVIC—L5;
6) SBAS—L1 and L5; and
7) QZSS—L1 C/A, L1 C, US, L2C, L5 and L6.

Some embodiments presented herein describe the non-limiting case of detecting interference in multiple GNSS frequency bands. As will be appreciated, other embodiments may easily be derived for detecting interference in a single GNSS frequency band and/or for detecting interference in other types of satellite signals and systems.

As used herein the term "peak level" means the maximum level of an RF signal over one or more time intervals. As described in more detail below, the peak level may be calculated from the output of a peak detector hardware element. The peak level may be an amplitude level or a power level, depending on the type of peak detector used.

As used herein the term "level" means the value of the RF signal parameter being measured (e.g. signal amplitude or signal power).

As used herein the term "threshold" means an amplitude level specified for a respective frequency band. The threshold level distinguishes between signal amplitudes which are considered to have been transmitted by a satellite and signals which are considered to have been transmitted by an interference source.

As used herein the term "exceeds a threshold" means that the peak level in a particular frequency band is higher than the threshold specified for that frequency band.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

1. Interference Detector

Figure 1:
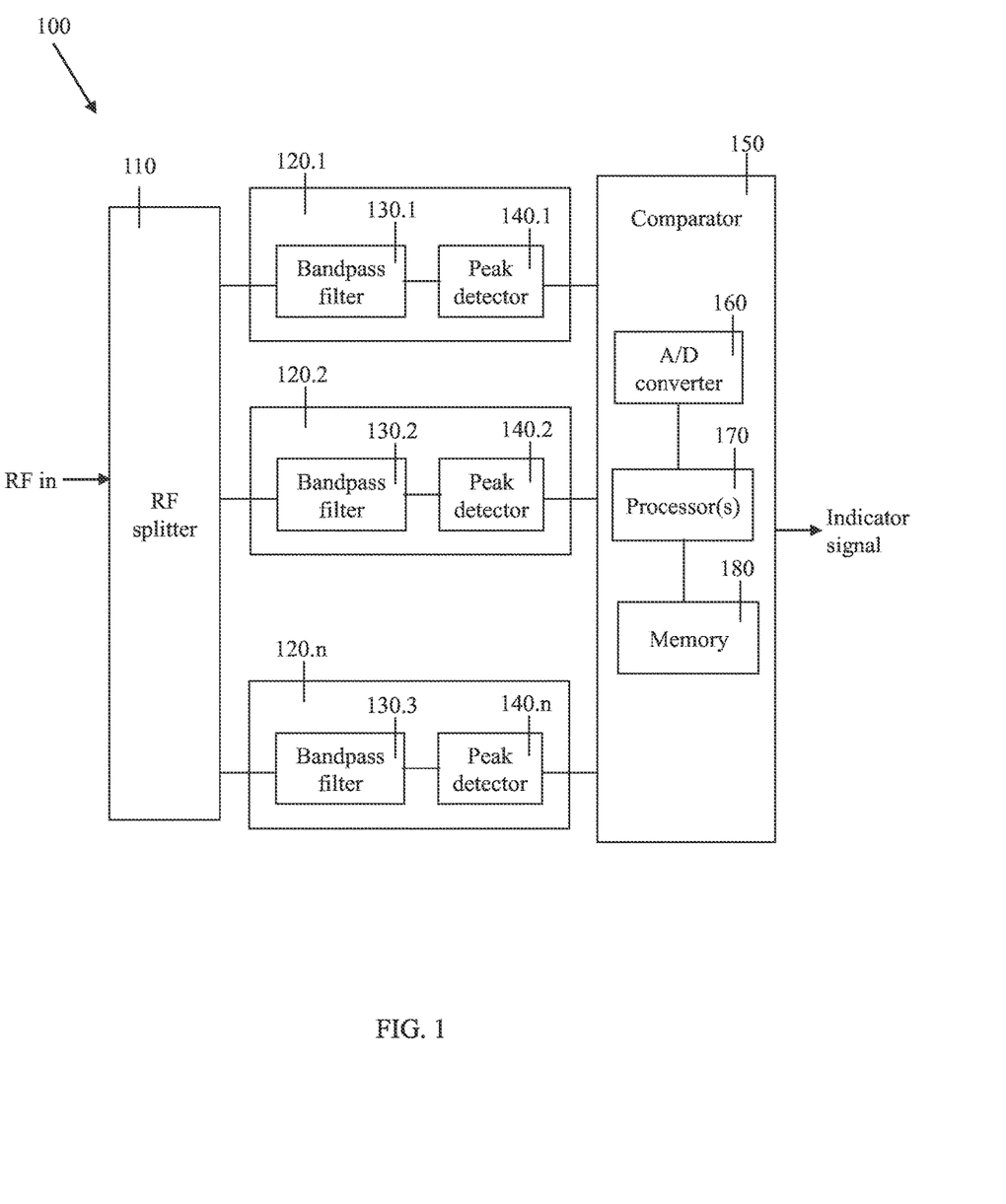
FIG. 1 is a simplified block diagram of an apparatus for detecting interference in GNSS signals, in accordance with some embodiments.

Referring now to the drawings, FIG. 1 is a simplified block diagram of an apparatus for detecting interference in Global Navigation Satellite System (GNSS) signals, in accordance with some embodiments. Interference detector 100 includes RF splitter 110, detectors 120.1-120.n and comparator 150, embodiments of which are described below.

Figure 4:
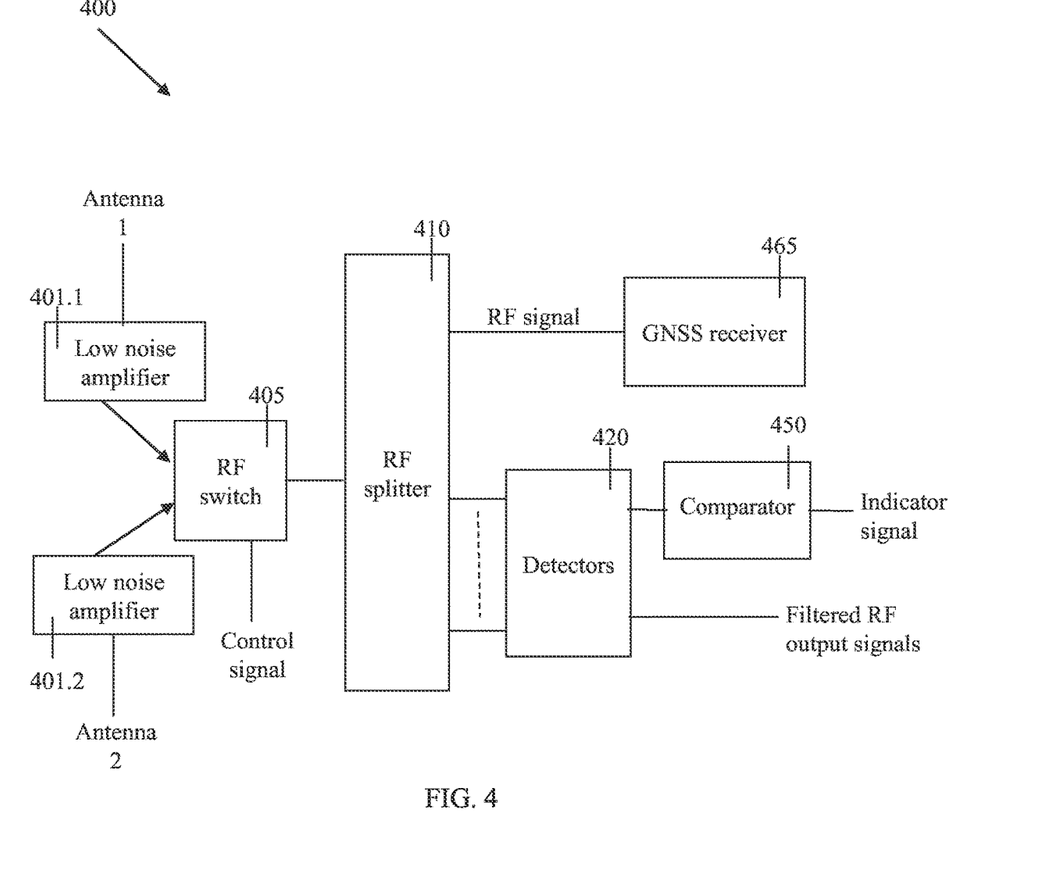
FIGS. 4 and 5 are simplified diagrams of an interference detection system, according to respective exemplary embodiments.

Optionally, interference detector 100 includes an RF switch (as shown for example in FIG. 4). The RF switch controls the source of the RF signal into interference detector 100 by switching the input of RF splitter 110 between different antennas in accordance with a control signal. Further optionally, these antennas include at least one active antenna and at least one passive antenna.

Optionally, at least one of the antenna feeds connects to the RF switch via a low noise amplifier.

1.1. RF Splitter

RF splitter 110 splits the input RF signal into multiple RF output signals. FIG. 1 shows an exemplary embodiment in which all of the splitter's RF outputs are connected to respective detectors. In alternate embodiments, the RF splitter has at least one additional RF output.

Optionally, RF splitter 110 splits the RF input signal into equal power RF output signals. Alternately, at least two of the RF output signals have different signal powers.

As used herein the term "RF splitter" means a device or circuit element that splits an input RF signal into multiple RF output signals. RF splitters are typically passive devices.

As used herein the term "splits the input RF signal into multiple RF output signals" and similar terms means that a single input RF signal is divided into two or more RF output signals without frequency conversion. As will be appreciated, the signal powers of the RF output signals are lower than the power of the input RF signal.

Figure 2:
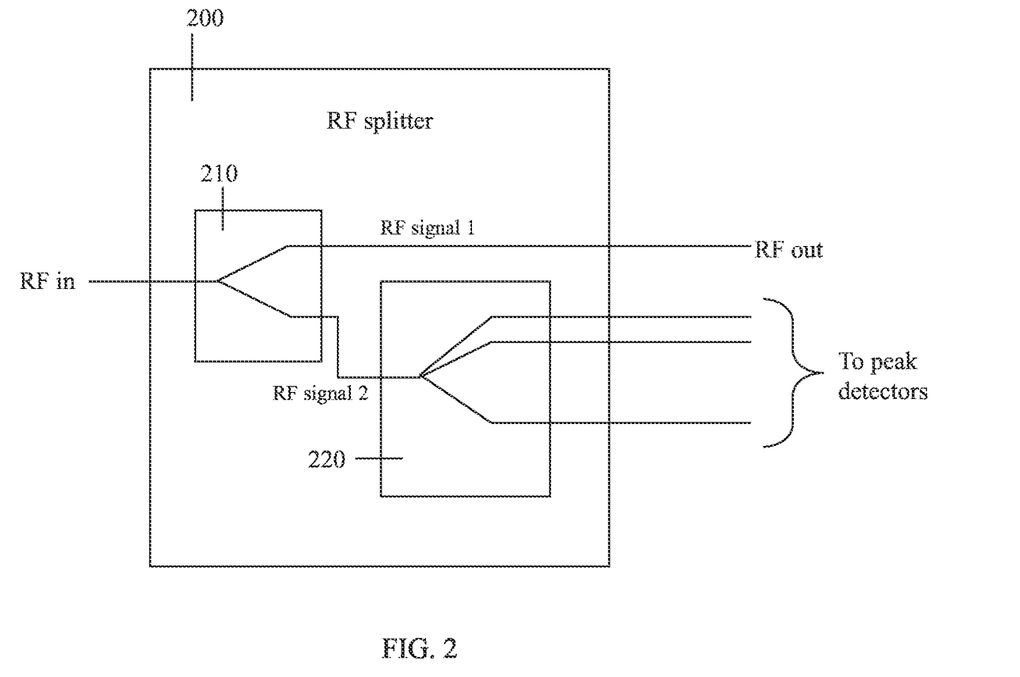
FIG. 2 is a simplified diagram of an RF splitter, according to an exemplary embodiment.

Reference is now made to FIG. 2, which is a simplified diagram of an RF splitter, according to an exemplary embodiment. RF splitter 200 includes two levels of splitters, denoted herein first internal splitter 210 and second internal splitter 220. First internal splitter 210 splits the input RF signal into two intermediate RF signals (denoted herein the RF signal 1 and the RF signal 2). The RF signal 1 is output from RF splitter 200. The RF signal 2 is split further by second internal splitter 220 in order to generate the RF signals for the detectors.

Optionally, the RF signal 1 is connected to the input of a GNSS receiver. In some embodiments the GNSS receiver is a hardware receiver. In alternate embodiments the GNSS receiver is a software receiver using processing circuitry of the computer running the software-based GNSS receiver. The software-based GNSS receiver may use an internal or external A/D converter.

1.2. Detectors

Referring again to FIG. 1, detectors 120.1-120.n include respective bandpass filters 130.1-130.n and respective peak detectors 140.1-140.n. For example, detector 120.1 includes bandpass filter 130.1 and peak detector 140.1. Bandpass filters 130.1-130.n filter the RF signals from RF splitter 110 into respective GNSS frequency bands. Peak detectors 140.1-140.n detect the amplitude of the filtered signal from the respective bandpass filter. Each peak detector outputs a signal which reflects the peak level of the filtered RF signal.

Optionally, peak detectors 140.1-140.n are of the same type. Alternately, peak detectors 140.1-140.n are of different types.

The peak detectors may be of any type known in the art that are suitable for operation in the required frequency range. Examples of peak detectors include:

i) Logarithmic Envelope Detector/Controller;
ii) Sample and hold Detector; and
iii) Software-based detector (e.g. using A/D conversion, fast Fourier transformation and analysis of the FFT results).

Figure 3A:
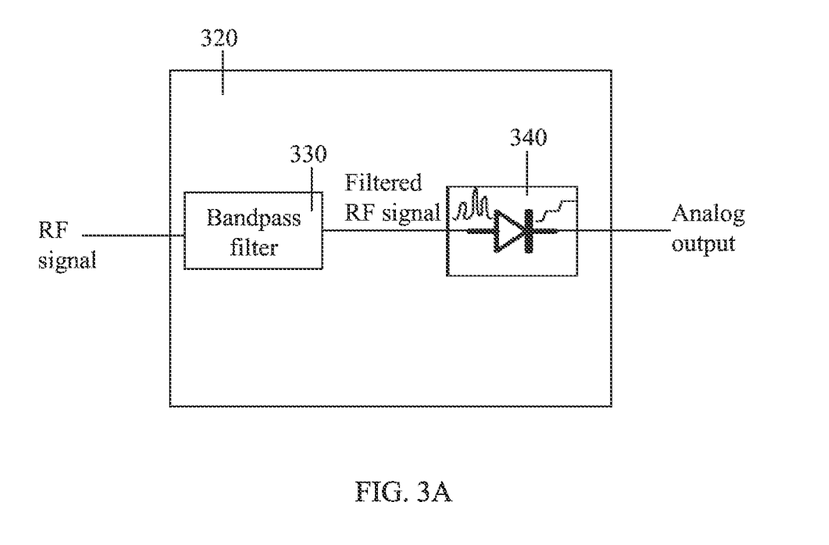
FIGS. 3A-3C are simplified circuit diagrams of a detector, according to respective exemplary embodiments.
Figure 3B:
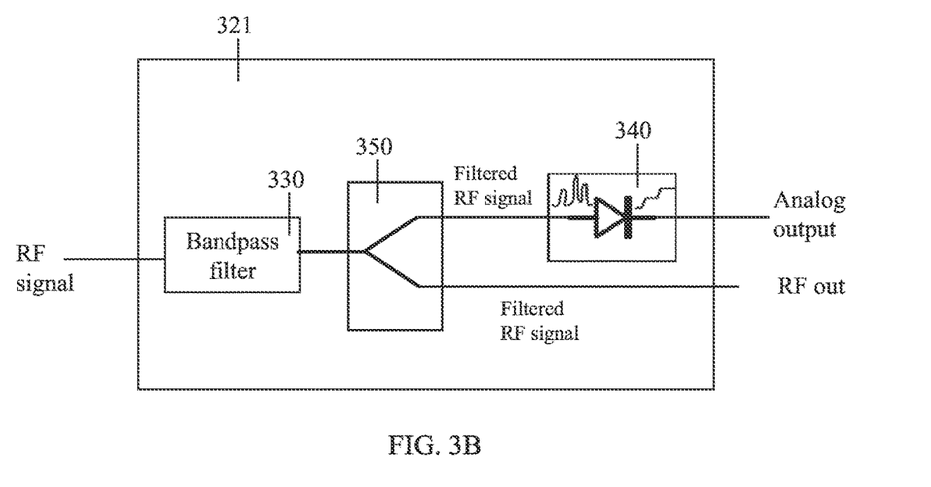
Figure 3C:
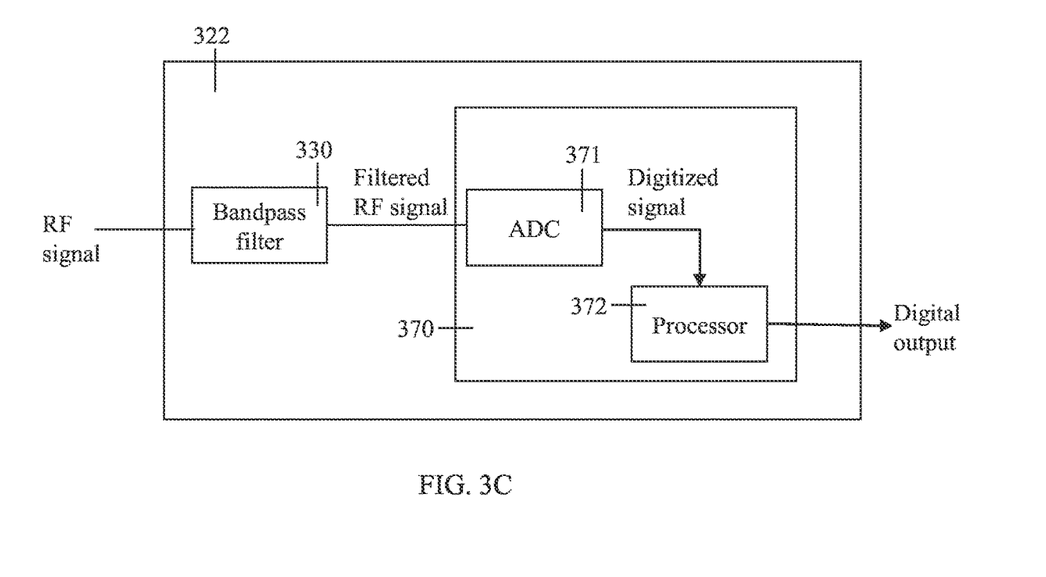

Reference is now made to FIGS. 3A-3C, which are simplified circuit diagrams of a detector, according to respective exemplary embodiments.

FIG. 3A shows detector 320, which includes bandpass filter 330 and peak detector 340. Bandpass filter 320 filters the input RF signal to a GNSS frequency band. The filter's passband may include the entire range of the GNSS frequency band or a portion of the frequency band. The filtered RF signal is input to peak detector 340, which outputs a signal which may be processed in order to determine the maximum amplitude of the filtered RF signal.

FIG. 3B shows detector 321, which includes bandpass filter 330 and peak detector 340 as described for FIG. 3A. In addition, detector 321 includes RF splitter 350 which splits the filtered RF signal at the output of the bandpass filter into two signals. One of these signals is input to peak detector 340 and the second signal is output from detector 321. The filtered RF signal at the RF output of detector 321 may be processed further at the RF level. For example, the processing may include down converting the filtered RF output and performing a spectral analysis of the down converted signal.

FIG. 3C shows detector 322, which includes bandpass filter 330 and software-based peak detector 370. Bandpass filter 330 filters the input RF signal to a GNSS frequency band. The filter's passband may include the entire range of the GNSS frequency band or a portion of the frequency band. The filtered RF signal is input to peak detector 370, which includes A/D converter 371 and processor 372. Processor 372 performs software-based fast Fourier transform (FFT) and peak detection of the filtered RF signal. Processor 372 outputs a digital signal which may be processed further in order to determine the peak level of the filtered RF signal.

1.3. Comparator

Referring again to FIG. 1, comparator 150 compares the outputs of detectors 120.1-120.$n$ to respective thresholds. When the peak exceeds the threshold, comparator 150 identifies that interference is present in that frequency band. If the threshold is not exceeded, comparator 150 identifies that interference is not present in that frequency band.

Optionally, the respective threshold is the expected amplitude of a satellite signal received in that frequency band plus a specified margin for at least one of the frequency bands. The expected amplitude of a received satellite signal in a particular frequency band may be known or calculated from the relative positions of the satellite and the GNSS receiver (and possibly other factors).

Optionally, the peak level is the maximum level of the filtered RF signal in a single time interval. In a second optional embodiment, respective maximum levels are detected over multiple time intervals and the peak amplitude is the average of the detected maximum amplitudes. In a third optional embodiment, respective maximum levels are detected over multiple time intervals and the peak amplitude is the largest one of the detected maximum amplitudes. Optionally, the peak level is an amplitude level. Alternatively, the peak level is a power level.

Optionally, the maximum levels are saved in a memory (e.g. internal memory 180). Averaging the maximum levels and/or determining the maximum level over a longer time period may be performed by the processor on the stored data.

Optionally, the peak detector is reset each time it samples the filtered RF signal.

Comparator 150 outputs a signal (denoted herein the indicator signal) which indicates whether interference is present or absent from one or more of the GNSS frequency bands. Optionally, when the peak is within a certain range around the threshold, comparator 150 indicates that it is not able to determine whether interference is present or absent in the respective frequency band.

Optionally, the indicator signal indicates whether interference is present or absent (and optionally undeterminable) for all of the frequency bands. Alternately, the indicator signal indicates results for only some of the frequency bands (e.g. frequency bands in which interference was identified and/or frequency bands in which interference was not identified).

Optionally, mitigating and/or reporting actions are performed when the indicator signal indicates that there is interference in one or more frequency bands. For example, the GNSS receiver may be instructed not to use navigation signal data in particular frequency band(s) for solving the navigation equations or an alert may be issued to an external system or to a user. Alternately or additionally, the interference level in one or more of the GNSS frequency bands is reported.

1.1.a. Analog to Digital Conversion and Digital Processing

Optionally, comparator 150 includes analog to digital (A/D) converter 160, which converts the analog output of at least one of peak detectors 140.1-140.$n$ into a digital signal (denoted herein a digitized peak level signal).

Optionally, comparator 150 includes at least one processor 170 which performs digital processing operations.

Optionally, processor 170 compares the digitized peak level signal(s) to the respective threshold(s) and determines if interference is present in one or more frequency bands.

Alternately or additionally, the threshold comparison is done at the analog level by comparing a peak detector analog output to an analog signal whose level reflects the threshold for the given frequency band.

Optionally, processor 170 is or includes a digital signal processor configured to process at least one RF signal. Further optionally, the digitized signal processor provides a spectral analysis of at least one filtered signal at the RF output of a detector (e.g. the RF out in FIG. 3B).

Optionally, processor 170 controls other operations and parameters of interference detector 100, enabling interference detector 100 to be adapted to different operating conditions (e.g. location, weather conditions and so forth). The operating parameters may be preset before operation and/or be dynamically adjustable during operation.

The operating parameters may include but are not limited to:

1) Threshold values;
2) Time interval length;
3) The way the peak level is determined (e.g. over a single time interval, as an average of multiple time intervals, etc.);
4) The indicator signal format;
5) The timing for outputting the indicator signal (e.g. periodically, whenever a change is detected, etc.); and
6) Switching between antennas providing the RF input signal.

1.1.b. Memory

Optionally, comparator 150 includes at least one memory 180. Memory 180 may store instructions to be executed by a processor and/or other data used for interference detection and/or other functions performed by processor.

FIG. 1 shows a non-limiting exemplary embodiment in which both processor 170 and memory 180 are part of comparator 150. Other embodiments are possible, for example using an external memory instead of or in addition to an internal memory.

The RF splitter(s), bandpass filters, peak detectors, A/D converter, processor(s) and memory may be of any type known in the art that are suitable for the interference detector implementation (such as frequency passbands, detection accuracy and processing speed).

2. Interference Detection Systems

Reference is now made to FIG. 4, which is a simplified diagram of an interference detection system, in accordance with a first exemplary embodiment.

Interference detector 400 includes RF switch 405, which connects the input of RF splitter 410 to antenna 1 or to antenna 2 based on the control signal. Optionally, the antennas are connected to RF switch 405 via low noise amplifiers 401.1-402.2. In alternate embodiments at least one of the antennas is connected directly to RF switch 405.

RF splitter 410 outputs respective RF signals to detectors 420, each of which includes a bandpass filters/peak detector pairs (as shown for example in FIG. 1).

Each bandpass filters/peak detectors pair outputs a respective peak level signal to comparator 450. Detectors 420 also outputs one or more of the filtered RF signals from the bandpass filters.

Comparator 450 compares the peak level signals to respective thresholds and identifies whether interference is present in the respective GNSS frequency bands. Based on the comparison, comparator 450 outputs an indicator signal which indicates which, if any, of the frequency bands is experiencing interference.

RF splitter 410 additionally outputs an RF signal to GNSS receiver 465.

Figure 5:
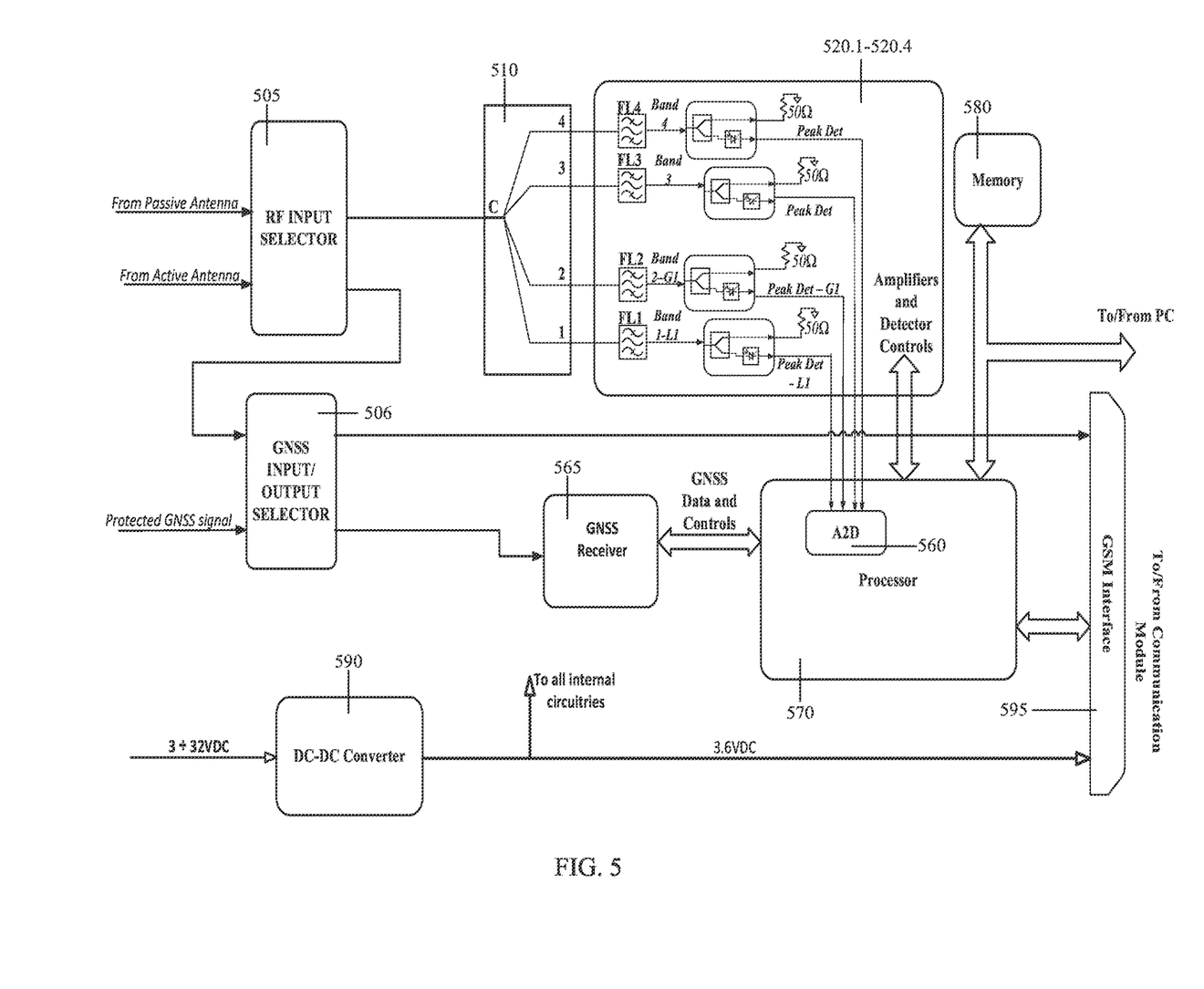

Reference is now made to FIG. 5, which is a simplified diagram of an interference detection system, in accordance with a second exemplary embodiment.

Interference detection system includes RF INPUT SELECTOR 505, which operates as a switch connecting the RF input of splitter 510 to a signal from an active GNSS antenna or to a signal from a passive GNSS antenna. The selected antenna signal is output to splitter 510 and to GNSS INPUT/OUTPUT SELECTOR 506.

GNSS INPUT/OUTPUT SELECTOR 506 switches the RF input of GNSS Receiver 565 between the output of RF INPUT SELECTOR 505 and an RF signal provided by a different source.

FIG. 5 shows a non-limiting example in which splitter 510 splits the RF input signal into four components. The components are provided to respective detectors 520.1-520.4. Other embodiments may include a different number of detectors with the number of splitter outputs adapted accordingly.

Each of detectors 520.1-520.4 includes a bandpass filter and peak detector.

The outputs of the peak detectors are provided to A2D converter 560 which converts them into digital signals. The digital signals are processed by Processor 570, which compares the peak levels to the respective threshold according to any of the embodiments described herein. When a peak level is larger than the respective threshold, processor 570 identifies that interference is present in that frequency band.

Processor 570 may perform many processing operations including but not limited to:

1) Communicating with GNSS Receiver 565 (e.g. GNSS data and control signals);

2) Storing and retrieving information from Memory 580;

3) Outputting alerts (e.g. by displaying them on a display and/or uploading information to the cloud);

4) Performing a spectral analysis of the digitized down converted filtered signals;

5) Setting amplifier and detector controls; and

6) Interacting with an external computer or system (e.g. to report the results of the analyses performed on the signals output by detectors 520.1-520.4 and/or to input external information such as user commands).

DC-DC Converter 590 provides 3.6 VDC to internal circuitry and to GSM Interface 595.

GSM Interface 595 is used for online reporting of a sensor's results to a cellular communication network.

3. Method of Interference Detection

Figure 6:
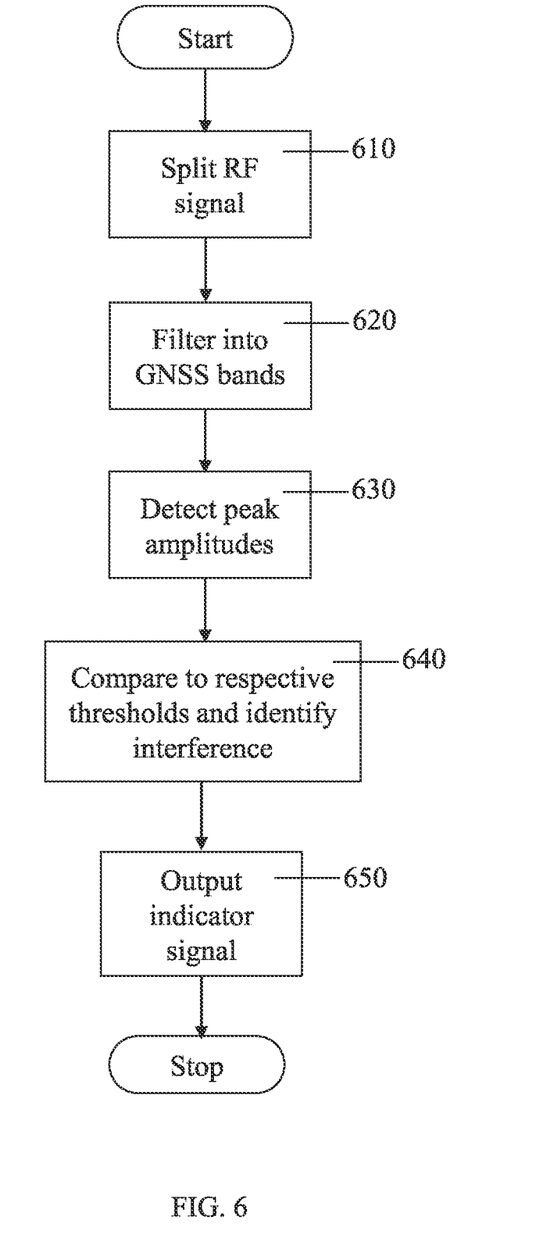
FIG. 6 is a simplified flowchart of a method for interference detector, according to some embodiments.

Reference is now made to FIG. 6, which is a simplified flowchart of a method for interference detector, according to some embodiments.

In 610, an input RF signal is split into multiple RF output signals. In 620, the RF output signals are filtered into respective GNSS frequency bands. In 630, respective peak levels are detected for the filtered RF signals. In 640 the peak levels are compared to respective thresholds. When a peak level exceeds its respective threshold, interference is identified in the associated frequency band. In 650 the indicator signal is output. The indicator signal indicates which, if any, frequency bands are undergoing interference.

Optionally, the indicator signal also includes the received signal level(s) and/or indicates frequency bands where it cannot be determined if there is interference because the peak level is close to the threshold.

Optionally, the respective threshold for at least one of the frequency bands is the expected amplitude of a satellite signal received in the frequency band plus a specified margin.

Optionally, the method further includes digitizing at least one of the peak levels. The comparison of the peak level to the threshold is performed on the digitized peak levels.

Optionally, for at least one of the peak detectors the peak level is the maximum RF signal amplitude in a single time period.

Optionally, for at least one of the peak detectors the peak level is calculated from the RF signal amplitude over multiple time intervals. For example, the peak level may be the average of the maximum amplitudes detected in multiple time periods.

Optionally, the method further includes issuing an alert when the presence of interference is identified in at least one of the GNSS frequency bands. The alert may indicate the frequency band(s) in which interference was detected. Further optionally, the alert may trigger mitigating and/or other actions in the interference detection system.

Optionally, the method further includes outputting a portion of the RF input signal to a GNSS receiver.

Optionally, the method further includes displaying a spectrum view of at least one of the filtered RF signals.

Satellite signals are received at very low signal strength. A high-amplitude RF signal received by a terrestrial receiver is unlikely to have been transmitted by a satellite. Embodiments of the invention detect analyze the peak level of filtered RF signals in order to identify whether interference is present in GNSS frequency bands. When the RF signal amplitude is high enough to exceed a threshold, it is unlikely that the signal originated at a GNSS satellite. As demonstrated above, much of the signal processing may be done at high speed at the RF/analog level. Many of the hardware components are passive or low power components, so that power supply requirements are low.

It is expected that during the life of a patent maturing from this application many relevant GNSS systems, GNSS frequency bands, satellite system frequency bands, RF splitters, bandpass filters, peak detectors, A/D converters, memories and processors will be developed and the scope of the term GNSS, frequency band, splitter, bandpass filter, peak detector, A/D converter, memory and processor are intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. An apparatus for detecting interference in Global Navigation Satellite System (GNSS) signals comprising:
    an RF splitter, configured for splitting a radio frequency (RF) input signal into a plurality of RF output signals;
    a plurality of detectors associated with said RF splitter, each of said detectors comprising:
        a bandpass filter configured for filtering one of said RF output signals into a respective GNSS frequency band; and
        a peak detector configured for detecting a peak level of said filtered RF signal; and
    a comparator associated with said plurality of detectors, configured for identifying a presence and an absence of interference in said GNSS frequency bands based on a comparison of said peak levels to respective thresholds, and for outputting a signal indicative of said presence and absence of identified interference;
    wherein said RF splitter comprises:
        an RF input configured for inputting said radio frequency signal;
        a first internal splitter configured for splitting said input RF signal into a first RF signal and a second RF signal;
        a second internal splitter configured for splitting said second RF signal into said RF output signals; and
        an RF output configured for outputting said first RF signal.

2. The apparatus of claim 1, wherein, for at least one of said frequency bands, said level comprises an amplitude level.

3. The apparatus of claim 1, wherein, for at least one of said frequency bands, said level comprises a power level.

4. The apparatus of claim 1, wherein, for at least one of said frequency bands, said respective threshold comprises an expected level of a satellite signal received in said frequency band plus a specified margin.

5. The apparatus of claim 1, wherein said comparator comprises an analog to digital (A/D) converter, wherein said A/D converter is configured to convert an output of at least one of said peak detectors into a digitized output signal and said comparison is performed on said digitized output signal.

6. The apparatus of claim 1, wherein, for at least one of said peak detectors, said peak level comprises a maximum level of said RF output signal detected in a single time interval.

7. The apparatus of claim 1, wherein, for at least one of said peak detectors, said peak level comprises an average of respective maximum levels detected in a plurality of time intervals.

8. The apparatus of claim 1, further comprising an RF switch configured to switch an input of said RF splitter between a plurality of antennas in accordance with a control signal.

9. The apparatus of claim 1, further configured to output said second RF signal to a GNSS receiver.

10. The apparatus of claim 1, further comprising a digital signal processor configured to process at least one of said filtered output signals.

11. The apparatus of claim 10, wherein said processing comprises providing a spectral analysis of said at least one of said filtered output signals.

12. A method for detecting interference in Global Navigation Satellite System (GNSS) signals comprising:
    splitting a radio frequency (RF) input signal into a plurality of RF output signals;
    filtering said RF output signals into respective GNSS frequency bands;
    detecting respective peak levels of said filtered RF signals;
    for each of said GNSS frequency bands, identifying interference when a peak level of said respective filtered RF signal exceeds a respective threshold; and outputting a signal indicative of a presence and absence of identified interference in at least one of said GNSS frequency bands;
wherein said splitting comprises:
inputting said radio frequency signal to an RF input;
splitting said input RF signal into a first RF signal and a second RF signal using a first internal splitter;
splitting said second RF signal into said RF output signals using a second internal splitter; and
outputting said first RF signal via an RF output.

13. The method of claim 12, wherein, for at least one of said frequency bands, said level comprises an amplitude level.

14. The method of claim 12, wherein, for at least one of said frequency bands, said level comprises a power level.

15. The method of claim 12, wherein, for at least one of said frequency bands, said respective threshold comprises an expected level of a satellite signal received in said frequency band plus a specified margin.

16. The method of claim 12, further comprising digitizing at least one of said peak levels, wherein said identifying is performed on said digitized peak levels.

17. The method of claim 12, wherein, for at least one of said peak detectors, said detecting a peak level comprises detecting a maximum level in a single time period.

18. The method of claim 12, wherein, for at least one of said peak detectors, said detecting a peak level comprises:
detecting respective maximum levels in a plurality of time intervals; and
calculating said peak level from said maximum levels.

19. The method of claim 12, further comprising issuing an alert when a presence of interference is identified in at least one of said GNSS frequency bands.

20. The method of claim 12, further comprising outputting a portion of said RF input signal to a GNSS receiver.

21. The method of claim 12, further comprising displaying a spectrum view of at least one of said filtered RF signals.

* * * * *